United States Patent
Zhu et al.

(10) Patent No.: US 12,022,418 B2
(45) Date of Patent: Jun. 25, 2024

(54) ESTABLISHING A MULTIPLE ACCESS CONNECTION

(71) Applicant: Apple Inc., Cupertino, CA (US)

(72) Inventors: Yifan Zhu, San Jose, CA (US); Cahya A Masputra, San Jose, CA (US); Krisztian Kiss, Hayward, CA (US); Lakshmi N. Kavuri, Cupertino, CA (US); Srinivasan Nimmala, San Jose, CA (US); Srirang A. Lovlekar, Cupertino, CA (US); Utkarsh Kumar, Fremont, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/949,499

(22) Filed: Oct. 30, 2020

(65) Prior Publication Data
US 2021/0136717 A1    May 6, 2021

Related U.S. Application Data

(60) Provisional application No. 62/981,486, filed on Feb. 25, 2020, provisional application No. 62/929,420, filed on Nov. 1, 2019.

(51) Int. Cl.
*H04W 76/12* (2018.01)
*H04L 69/322* (2022.01)
(Continued)

(52) U.S. Cl.
CPC ......... *H04W 60/005* (2013.01); *H04L 69/322* (2013.01); *H04W 8/08* (2013.01); *H04W 76/12* (2018.02)

(58) Field of Classification Search
CPC ..... H04W 60/005; H04W 76/12; H04W 8/08; H04W 88/06; H04W 60/04; H04W 76/16; H04W 48/18; H04W 76/18; H04L 69/322
See application file for complete search history.

(56) References Cited

U.S. PATENT DOCUMENTS

2016/0255674 A1* 9/2016 Niemi ................... H04W 60/04
                                                       455/435.1
2019/0394833 A1* 12/2019 Talebi Fard ........ H04W 68/005
(Continued)

FOREIGN PATENT DOCUMENTS

WO     2019/161240     8/2019

OTHER PUBLICATIONS

3GPP502 (3GPP TS 23.502v16.2.0, Procedures for the 5G System Stage 2, Jun. 2019).*

(Continued)

*Primary Examiner* — Lakeram Jangbahadur
(74) *Attorney, Agent, or Firm* — Fay Kaplun & Marcin, LLP

(57) ABSTRACT

A user equipment (UE) may be configured to reattempt to establish a multiple access (MA) protocol data unit (PDU) session when the UE moves to a new registration area. The UE transmits a request for a MA PDU session to the network, receives a message from the network indicating the request has been rejected, wherein the message further includes a status indication for reattempt requests to establish the MA PDU session, determines, when the UE moves into a new registration area of a PLMN, whether reattempt requests are allowed based on, at least, the status indication and transmits, when reattempt requests are allowed, a further request to establish the MA PDU session.

16 Claims, 8 Drawing Sheets

(51) Int. Cl.
*H04W 8/08* (2009.01)
*H04W 60/00* (2009.01)

(56) References Cited

U.S. PATENT DOCUMENTS

| | | | | |
|---|---|---|---|---|
| 2020/0092923 A1* | 3/2020 | Abraham | .............. | H04L 12/185 |
| 2020/0163145 A1* | 5/2020 | Park | ...................... | H04W 76/30 |
| 2020/0178196 A1* | 6/2020 | Wang | .................... | H04W 76/16 |
| 2020/0196133 A1* | 6/2020 | Kawasaki | ............. | H04W 28/24 |
| 2020/0280948 A1* | 9/2020 | Youn | ..................... | H04W 76/12 |

OTHER PUBLICATIONS

3GPP360 (Network initiated MA POU Session establishment, S2-1903360, Apr. 2019 ).*
3GPP TS 23.502 V16.2.0, Procedures for the 5G System (Sep. 2019).*
"3rd Generation Partnership Project; Technical Specification Group Services and System Aspects; Procedures for the 5G System; Stage 2 (Release16)", Sep. 24, 2019.
Motorola Mobility et al., "Network Initiated MA PDU Session Establishment", 3GPP Draft, S2-1903360, Apr. 2, 2019.
ZTE, "Proper Network Handling of MA & SA PDU Session Establishment Conversion", 3GPP Draft, S2-1902970, Apr. 2, 2019.
ZTE, "Proper Network Handling of MA & SA PDU Session Establishment Conversion", 3GPP Draft, S2-1902969, Apr. 2, 2019.
ZTE, "Considerations on Downgrading MA-PDU Session Request to SA PDU Session", 3GPP Draft. S2-1901653, Feb. 19, 2019.
ZTE, "Introduction of ATSSS Procedures including Multi-Access PDU Session Establishment", 3GPP Draft, S2-1901681, Feb. 19, 2019.
LG Electronics, "Discussion on MA PDU establishment when VPLMN does not support ATSSS", 3GPP Draft, S2-1909615, Oct. 4, 2019.
LG Electronics, "MA PDU Session establishment to support roaming scenario when the VPLMN does not support ATSSS", 3GPP Draft, S2-1909616, Oct. 4, 2019.
Motorola Mobility et al., "MA PDU session rejection due to operator policy and subscription policy", 3GPP Draft, C1-196953, Oct. 11, 2019.

* cited by examiner

Re-attempt Indicator IE 300

| 8 | 7 | 6 | 5 | 4 | 3 | 2 | 1 | |
|---|---|---|---|---|---|---|---|---|
| Re-attempt Indicator IE 300 | octet 1 | | | | | | | |
| Length of Re-attempt indicator contents | octet 2 | | | | | | | |
| 0 Spare | 0 Spare | 0 Spare | 0 Spare | 0 Spare | 0 Spare | EPL MNC | RATC | octet 3 |

Fig. 3

5GS Tracking Area Indicator IE 400

| 8 | 7 | 6 | 5 | 4 | 3 | 2 | 1 | |
|---|---|---|---|---|---|---|---|---|
| 5GS tracking area identity list IE | octet 1 | | | | | | | |
| Length of 5GS tracking area identity list contents | octet 2 | | | | | | | |
| Partial tracking area identity list 1 | octet 3<br>octet i | | | | | | | |
| Partial tracking area identity list 2 | octet i+1*<br>octet l* | | | | | | | |
| ... | octet l+1*<br>octet m* | | | | | | | |
| Partial tracking area identity list p | octet m+1*<br>octet n* | | | | | | | |

Fig. 4

ESTABLISHING A MULTIPLE ACCESS CONNECTION

PRIORITY CLAIM/INCORPORATION BY REFERENCE

This application claims priority to U.S. Provisional Application Ser. No. 62/929,420, entitled "Establishing a Multiple Access Connection," filed Nov. 1, 2019, and U.S. Provisional Application Ser. No. 62/981,486, entitled "Establishing a Multiple Access Connection," filed Feb. 25, 2020, the entirety of both applications being incorporated by reference herein.

BACKGROUND

A user equipment (UE) may establish a connection to at least one of multiple different networks or types of networks. Some networks allow for multiple access (MA). MA allows multiple UEs to share channels in the allotted spectrum. Single access (SA) does not allow for such sharing. Thus, MA is typically a more efficient use of the bandwidth than SA. However, not all networks support MA in all geographic areas.

In 5G New Radio (5G NR) networks, a UE may request the network to set up an MA session for the UE through the use of a Multiple Access Protocol Data Unit (MA-PDU). The network may accept the MA-PDU and set up the MA session for the UE. On the other hand, the network may reject the MA-PDU and not set up the MA session. There may be multiple reasons for the rejection, some of which will be discussed in greater detail below. When the UE receives a rejection, the UE may want to re-request the MA session. However, in some instances, it may be inefficient for the UE to re-request the MA session with the network because it is unlikely to have an MA session set up by the network.

SUMMARY

Some exemplary embodiments are related to a user equipment (UE) having a transceiver configured to communicate with a network and a processor communicatively coupled to the transceiver and configured to perform operations. The operations include transmitting a request for a multiple access (MA) protocol data unit (PDU) session with the network, receiving a message from the network indicating the request has been rejected, wherein the message further includes a status indication for reattempt requests to establish the MA PDU session, determining, when the UE moves into a new registration area of a PLMN, whether reattempt requests are allowed based on, at least, the status indication and transmitting, when reattempt requests are allowed, a further request to establish the MA PDU session.

Other exemplary embodiments are related to a method performed at a wireless network. The method includes receiving, from a user equipment (UE), a request for a multiple access (MA) protocol data unit (PDU) session and transmitting a message indicating the request has been rejected, wherein the message further includes a status indication for reattempt requests to establish the MA PDU session.

Still further exemplary embodiments are related to a user equipment (UE) having a transceiver configured to communicate with a network and a processor communicatively coupled to the transceiver and configured to perform operations. The operations include registering with an access and mobility management function (AMF) and receiving an indication that access traffic steering, switching and splitting (ATSSS) is not supported in a registration area.

Additional exemplary embodiments are related to a method performed by an access and mobility management function (AMF) or a Mobility Management Entity (MME) of a wireless network. The method includes receiving an indication that a user equipment (UE) is configured with access traffic steering, switching and splitting (ATSSS), determining that the AMF does not support ATSSS and selecting a further AMF for the UE.

BRIEF DESCRIPTION OF THE DRAWINGS

FIG. 3 shows an exemplary information element (IE) that may be included in a PDU Session Establishment Reject message or a PDU Session Establishment Accept message according to various exemplary embodiments.

FIG. 4 shows a second exemplary IE that may be included in a PDU Session Establishment Reject message or a PDU Session Establishment Accept message according to various exemplary embodiments.

DETAILED DESCRIPTION

Figure 1:
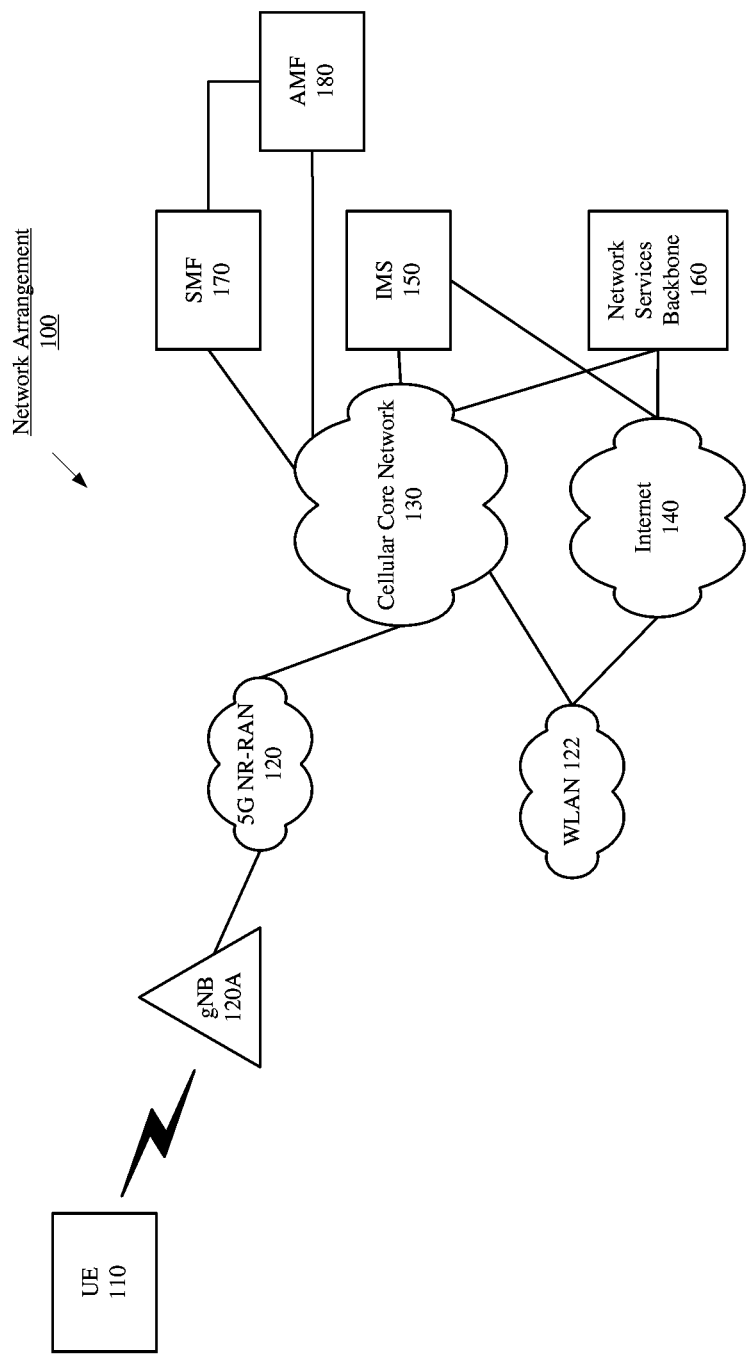
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to a user equipment (UE) establishing a multiple access (MA) session with a network. In a first aspect, the exemplary embodiments relate to the UE and the network exchanging capability information regarding MA functionality. As will be described below, this allows the UE and the network to consider MA functionality during network registration. In a second aspect, the exemplary embodiments relate to determining when a UE is to request a MA session with a network after the network has previously rejected such a request. As will be described below, the exemplary embodiments improve the efficiency of the UE by preventing the UE from making an MA request when it is unlikely to be granted but allowing the UE to make the request when there is a chance the request will be granted.

The exemplary embodiments are described with regard to the UE. However, the use of a UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

The exemplary embodiments will be described with reference to the exemplary network being a 5G new radio (5G NR) network. However, it should be understood that the exemplary embodiments may be implemented in any network that allows MA. Moreover, because the exemplary network is described as a 5G NR network, various exemplary scenario will be described using 5G NR terminology. For example, reference may be made to concepts such as access traffic steering, switching and splitting (ATSSS), an access and mobility management function (AMF), UE mobility management (MM) core network capability information and a Multiple Access Protocol Data Unit (MA-PDU). However, it should be understood that different networks or entities may refer to similar concepts by different names.

Those skilled in the art will understand that ATSSS is a feature that enables a multi-access PDU connectivity service which can exchange data between the UE and the core network by simultaneously using access networks. The PDU connectivity services are realized by establishing a MA-PDU session (e.g., a PDU session that may have user-plane resources on two or more access networks). The ATSSS feature may not be supported by every UE. On the network side, ATSSS may not be supported by each AMF and/or within each registration area. Some exemplary embodiments relate to the UE and the network exchanging ATSSS capability information during network registration. This allows the UE and the network to consider whether MA-PDU sessions are supported when configuring a network connection for a UE.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120 and a wireless local access network (WLAN) 122. However, it should be understood that the UE 110 may also communicate with other types of networks and the UE 110 may also communicate with networks over a wired connection. Therefore, the UE 110 may include a 5G NR chipset to communicate with the 5G NR-RAN 120 and an ISM chipset to communicate with the WLAN 122.

The 5G NR-RAN 120 may be a portion of a cellular network that may be deployed by cellular providers (e.g., Verizon, AT&T, T-Mobile, etc.). The networks 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 122 may include any type of wireless local area network (WiFi, Hot Spot, IEEE 802.11x networks, etc.).

The UE 110 may connect to the 5G NR-RAN via the gNB 120A. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120). Reference to the 5G NR-RAN 120 is provided for illustrative purposes and any type of network may be used. For example, the UE 110 may also connect to an LTE RAN (not pictured) or a Legacy RAN (not pictured).

In addition to the networks 120 and 122 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

The cellular core network 130 may include a Session Management Function (SMF) 170. The SMF 170 may be the component that is responsible for creating, updating and removing Protocol Data Unit (PDU) sessions (including MA-PDUs). The cellular core network 130 may also include an Access and Mobility Management Function (AMF) 180. The AMF 180 may be the component that communicates with the UE 110 during network registration, receives PDU requests and forwards session management requirements over the to the SMF 170. To provide a general example of MA-PDU signaling, the UE 110 may transmit an MA-PDU to the AMF 180 through the 5G NR-RAN 120 via the gNB 120A, or through the WLAN 122 via N3IWF. The MA-PDU may be routed to the AMF 180 which will then forward the MA-PDU to the appropriate SMF (e.g., SMF 170) to act on the request. The SMF 170 and AMF 180 being shown as part of the cellular core network 130 is only exemplary as this functionality may also reside in the 5G NR-RAN 120. In addition, those skilled in the art will understand that the functionality of the SMF 170 and AMF 180 may be spread throughout the cellular network and the functionality may vary from location to location within the cellular network. Those skilled in the art will also understand that the network may include multiple instances of AMFs and SMFs, thus reference to a single SMF 170 and AMF 180 are merely for illustrative purposes.

The request for the MA session, in the form of the MA-PDU, may be accepted or rejected by the 5G NR-RAN 120. When the request is accepted, the SMF 170 may set up the MA session for the UE 110. When the request is rejected, the SMF 170 will typically set up a SA session for the UE 110. The reason for the rejection may be communicated to the UE 110 or the UE 110 may understand that the request was rejected because it has been set up in a SA session rather than an MA session. In one example, the UE 110 may receive a message from the SMF 170 as a rejection, e.g., PDU Session Establishment Reject. In another example, the UE may receive a message from the SMF 170 as an acceptance, e.g., PDU Session Establishment Accept, but the acceptance is for a SA session which is an implicit rejection of the MA session.

There may be many reasons for the rejection. For example, either the SMF 170 or the AMF 180 may not support the MA-PDU. In another example, the Single Network Slice Selection Assistance Information (S-NSSAI) may not be allowed on both MA and SA. In a still further example, there may be a policy control function (PCF) that prevents MA based on a policy of the network provider or subscription data of the user.

The examples of reasons for the rejection of the MA-PDU provided above are not the only reasons for a MA-PDU rejection, but are being used to illustrate the fact that different rejection reasons may result in different manners for the UE 110 to operate with respect to re-requesting an MA session from the network. For example, the reasons provided above related to the S-NSSAI or PCF may illustrate exemplary reasons where the UE 110 is never likely to have its MA-PDU accepted by the PLMN. Thus, if the MA-PDU is rejected for this type of reason, the UE 110 may be prevented from re-requesting the MA-PDU within the same PLMN because it will likely be a waste of both the resources of the PLMN and the UE 110. On the other hand, the rejection reasons related to the SMF 170 or the AMF 180 not supporting the MA-PDU may change as the UE 110 moves to a different registration area of the network. For example, a provider network (e.g., Public Land Mobile Network (PLMN)) may support MA in one region and not support MA in another region. Thus, if the MA-PDU is rejected for this type of reason, the UE 110 may re-request the MA-PDU when the UE 110 moves to a new registration area because there is a chance that the MA-PDU will be accepted in the new registration area.

Some exemplary embodiments relate to the network and the UE 110 exchanging capability information related to MA. Other exemplary embodiments may relate to determining when the UE should re-request the MA session after a previous rejection of the session by the network and manners of triggering the re-request.

Figure 2:
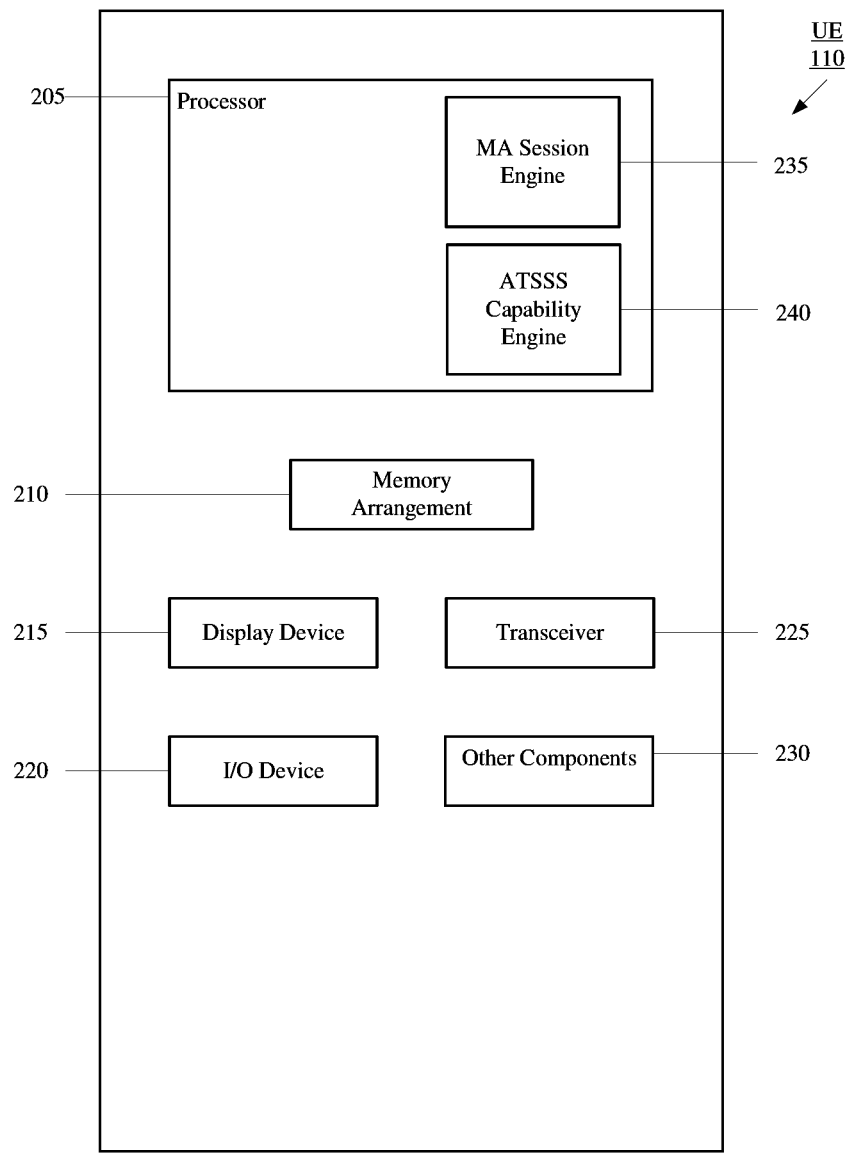
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, an antenna panel 230 and other components 235. The other components 235 may include, for example, a SIM card, an embedded SIM (eSIM), an audio input device, an audio output device, a battery that provides a limited power supply, a data acquisition device, ports to electrically connect the UE 110 to other electronic devices, etc.

The processor 205 may be configured to execute a plurality of engines of the UE 110. For example, the engines may include an MA session SMS engine 235 and an ATSSS capability engine 240. The MA session engine 235 may manage when the UE 110 requests an MA session after a previous request has been rejected. The ATSSS capability engine 240 may manage the transmission of ATSSS capability information to the network and trigger an appropriate response to ATSSS capability information that is received from the network.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the WLAN 122, etc. Accordingly, the transceiver 225 may operate on a variety of different frequencies or channels (e.g., set of consecutive frequencies).

Figure 5:
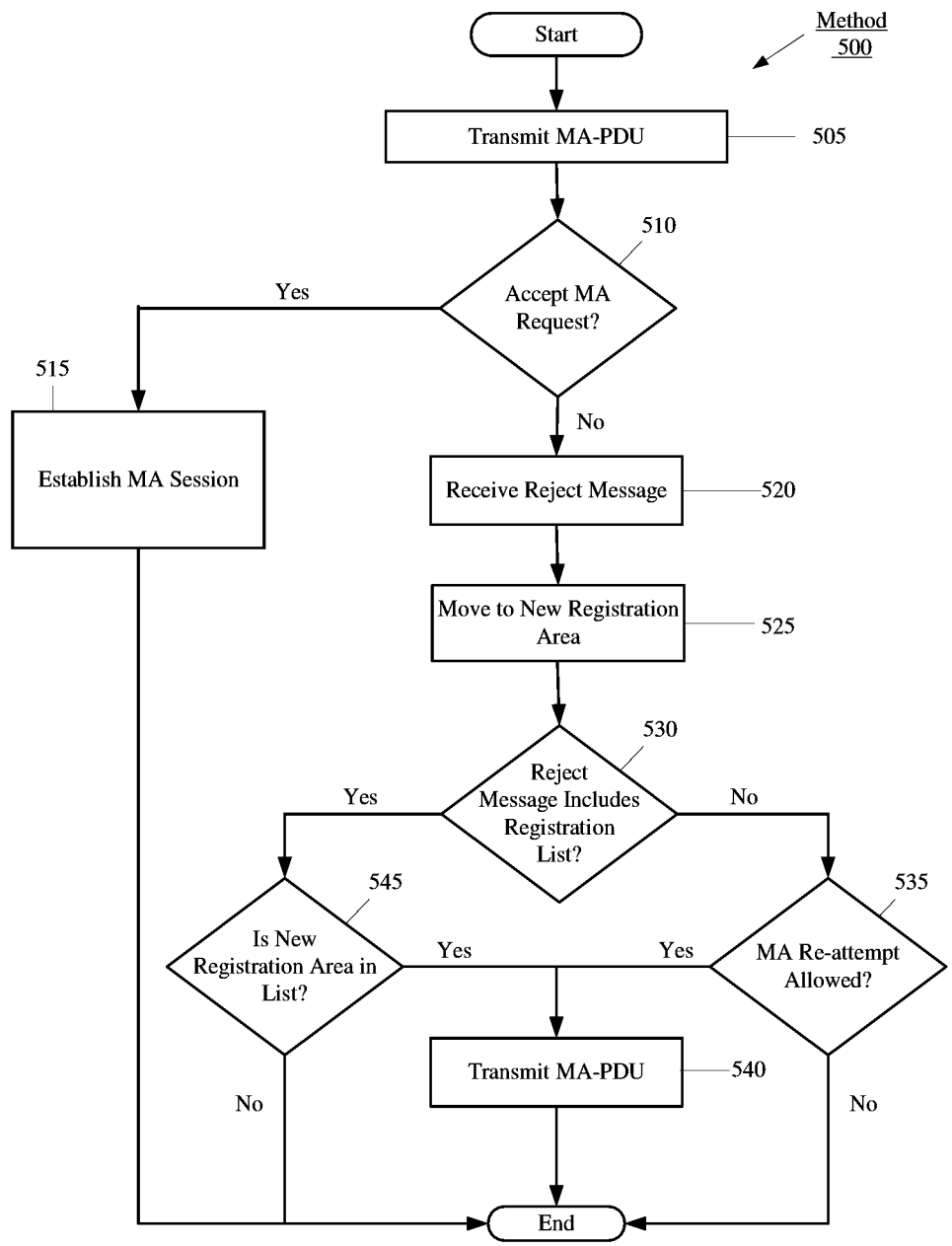
FIG. 5 shows an exemplary method for a UE to trigger a reattempt to establish an MA session according to various exemplary embodiments.

Initially, various exemplary embodiments related to determining when a UE is to request a MA session with a network after the network has previously rejected such a request will be described below. Specifically, FIGS. 3 and 4 will illustrate exemplary IEs that may be included during PDU session establishment procedures. FIG. 5 will illustrate an exemplary method for triggering the UE 110 to reattempt establishing a MA session and FIG. 6 will show an exemplary signaling diagram illustrating the network triggering a reattempt to establish an MA session. Subsequently, various exemplary embodiments related to exchanging ATSSS information during network registration will be described with regard to FIGS. 7-9.

In one exemplary embodiment, the PDU Session Establishment Reject message or the PDU Session Establishment Accept message that is received by the UE 110 when the MA session has been rejected may include an indicator as to whether the UE 110 is allowed to reattempt the MA-PDU when the UE 110 moves to a different registration area of the same PLMN. As will be understood by those skilled in the art, since the indicator is being received by the UE 110 from the network in response to a MA-PDU, the determination as to whether the UE 110 is allowed to reattempt the MA-PDU is being made by the network (e.g., AMF 180, SMF 170). The messages may be configured to include an IE that indicates whether the reattempt is allowed. A portion of an exemplary IE is described below with regard to FIG. 3. This indication may be used by the UE 110 to determine whether the UE should reattempt the MA-PDU when moving to a new registration area of the PLMN. Those skilled in the art will understand that the UE 110 may move to a new registration area of a different PLMN that is equivalent to the current PLMN and the reattempt indicator may be valid for the equivalent PLMN as well as the current PLMN.

FIG. 3 shows an exemplary IE 300 that may be included in a PDU Session Establishment Reject message or a PDU Session Establishment Accept message according to various exemplary embodiments. The IE 300 is shown as including 3 octets and including multiple portions. However, the IE 300 is not intended to limit the exemplary embodiments in any way. An actual IE may be any appropriate length, include more or less information and convey its contents in any appropriate manner.

The IE 300 may be the "Re-attempt Indicator" IE that is currently defined in 3GPP TS 24.501. However, other currently existing IEs or IEs that are defined in the future may include the MA-PDU reattempt indication. The IE 300 includes a bit 3 of octet 3 that is labeled as spare. This bit may be used as the MA-PDU reattempt indication. For example, if the bit is set to a value of 0, this may indicate to the UE 110 that the MA-PDU should not be attempted when the UE 110 enters a new registration area of the PLMN. On the other hand, if the bit is set to a value of 1, this may indicate to the UE 110 that the MA-PDU may be attempted when the UE 110 enters a new registration area of the PLMN. The IE 300 also includes additional spare bits in octet 3. Any of these spare bits may be used as the MA-PDU reattempt indication.

In another exemplary embodiment, the PDU Session Establishment Reject message or the PDU Session Establishment Accept message that is received by the UE 110 when the MA session has been rejected may include a list of registration areas in the PLMN that support MA. In this manner, once the UE 110 has the list of registration areas that support MA in the PLMN, the UE 110 may determine, when moving into a new registration area, whether the new registration area is included in the list. If the new registration area is included in the list, the UE 110 may reattempt the MA-PDU. If the new registration area is not included in the list, the UE 110 may skip a reattempt of the MA-PDU upon entering the new registration area. Again, similar to the exemplary indication provided above, since the list of registration areas is being received by the UE 110 from the network in response to a MA-PDU, the determination as to whether the UE 110 should reattempt the MA-PDU is being made by the network (e.g., 5G NR-RAN 120). The messages may again be configured to include an information element (IE) that includes the registration area list. A portion of an exemplary IE is described below with regard to FIG. 4.

FIG. 4 shows a second exemplary IE 400 that may be included in a PDU Session Establishment Reject message or a PDU Session Establishment Accept message according to various exemplary embodiments. The IE 400 is shown as including multiple octets. However, the IE 400 is not intended to limit the exemplary embodiments in any way. An actual IE may be any appropriate length, include more or less information and convey its contents in any appropriate manner.

The IE 400 may be the "5GS Tracking Area Indicator" IE that is currently defined in 3GPP TS 24.501. However, other currently existing IEs or IEs that are defined in the future may include the list of registration areas that support MA. The IE 400 includes octets 3 to N that may be used to provide the UE 110 with the list of registration areas that support MA. For example, if the UE 110 moves into a registration area that is listed in octet 3 of the IE 400, this may indicate to the UE 110 that the MA-PDU may be attempted. On the other hand, when the UE 110 enters a new registration area that is not included in the list of IE 400, this may indicate to the UE 110 that the MA-PDU should not be reattempted.

In the above examples of the IEs 300 and 400, it was described that the network (e.g., AMF 180, SMF 170) was making the determination as to whether the UE 110 should reattempt the MA-PDU when the UE 110 moves into a new registration area. However, while the network is making the determination, the UE 110 may be the component that triggers the reattempt. For example, the UE 110 may read the IEs 300 or 400 upon moving into a new registration area and if the reattempt is permitted, the UE 110 will reattempt to establish an MA session by transmitting an MA-PDU to the 5G NR-RAN 120. Thus, in this example, the 5G NR-RAN makes the determination with respect to when a reattempt should be made and the UE 110 triggers the reattempt.

FIG. 5 shows a method 500 for UE triggering of a reattempt to establish an MA session according to various exemplary embodiments. The method 500 will be described with regard to the network arrangement 100 of FIG. 1 and the UE 110 of FIG. 2.

In 505, the UE 110 transmits a request for an MA session (e.g., an MA-PDU) to the 5G NR-RAN 120 via the gNB 120A. The 5G-NR RAN 120 (and the core network 130) process the request and either accept or reject the request. In 510, it is determined whether the MA-PDU has been accepted. If accepted, the method proceeds to 515 where the MA session is established and the method 500 ends. If rejected, in 520, the 5G NR-RAN 120 will send a reject message to the UE 110. As described above, the reject message may comprise a PDU Session Establishment Reject message or a PDU Session Establishment Accept Message. Again, the PDU Session Establishment Accept Message is an implicit rejection if the accept indicates that a SA session is to be established rather than the requested MA session.

In 525, the UE 110 moves to a new registration area. As described above, in this example, the UE 110 will trigger the reattempt if the reattempt is allowed. In 530, the UE 110 will determine if the reject message included the list of registration areas of the PLMN that support MA. If the registration list is not included in the reject message, the method continues to 535 to determine whether the MA-PDU reattempt is allowed. For example, is the bit in IE 300 set such that a reattempt is allowed. If the reattempt is allowed, the method continues to 540 where the UE 110 transmits an MA-PDU to the 5G NR-RAN 120 to attempt to establish an MA session and the method ends. If the reattempt is not allowed, the method ends without attempting the MA-PDU.

Returning to 530, if the registration list is included in the reject message (e.g., the IE 400 is included in the reject message), the method continues to 545 to determine whether the new registration area is included in the list. If the new registration area is included in the registration list (e.g., it is a registration area that supports MA), the method continues to 540 where the UE 110 transmits an MA-PDU to the 5G NR-RAN 120 to attempt to establish an MA session and the method ends. If the new registration area is not included in the list, the method ends without attempting the MA-PDU. Those skilled in the art will understand that the operations associated with 530-545 may be performed each time the UE moves to a new registration area.

Figure 6:
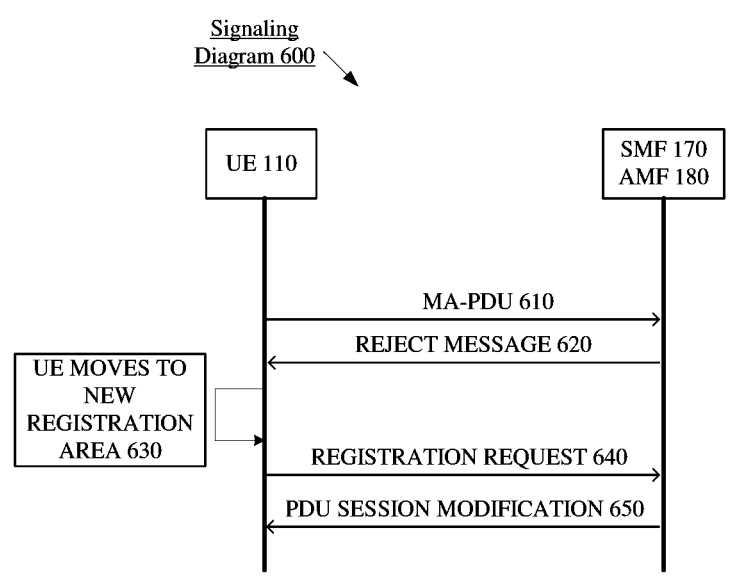
FIG. 6 shows an exemplary signaling diagram illustrating the network triggering a reattempt to establish an MA session according to various exemplary embodiments.

FIG. 6 shows an exemplary signaling diagram 600 illustrating the network 120 triggering a reattempt to establish an MA session according to various exemplary embodiments. In this exemplary embodiment, the network (e.g., the 5G NR-RAN 120) may trigger the reattempt to establish an MA session. In this example, the signaling diagram 600 shows a series of messages exchanged by the UE 110 and the SMF 170 and/or the AMF 180. As described above, the functionality associated with the SMF 170 and/or AMF 180 may be distributed throughout the PLMN including in the 5G NR-RAN 120 and/or the core network 130.

The UE 110 transmits an MA-PDU 610 to the SMF 170/AMF 180 to attempt to establish an MA session. In this example, it may be considered that the SMF 170/AMF 180 reject the request. However, the rejection may be considered to be of a type where the UE 110 should be allowed to reattempt to establish an MA session when the UE 110 moves to a new registration area of the PLMN. Thus, the SMF 170/AMF 180 sends a reject message 620 that includes an indication that MA-PDU reattempts are allowed when the UE 110 moves to a new registration area, e.g., the reject message 620 includes the IE 300 with the bit set to allow MA-PDU reattempts.

The UE 110 then moves 630 into a new registration area. In response to this move 630, the UE sends a registration request 640 to the SMF 170/AMF 180. As part of the registration request 640, the UE 110 may include the indication (e.g., IE 300) that the UE 110 is allowed to reattempt to establish an MA session when moving to a new registration area. When the SMF 170/AMF 180 receive the registration request 640 including the indication that the UE 110 is allowed to reattempt to establish an MA session when moving to a new registration area, the SMF 170/AMF 180 may send a PDU session modification command 650 to change the UE 110 session from a SA session to an MA session. Those skilled in the art will understand that the PDU session modification command 650 will be sent if the new registration area supports MA. Thus, in this manner, the reattempt at establishing the MA session is triggered by the network, rather than the UE 110.

In another exemplary embodiment, the UE 110 may keep track of the registration areas in which MA sessions have been established in the past. For example, when the UE 110 has established an MA session with the 5G NR-RAN 120, the UE 110 may record the registration area in which the MA session has been established, e.g., by creating a list and storing the list in the memory arrangement 210 of the UE 110.

When an MA-PDU request by the UE 110 has been rejected and the UE 110 subsequently moves into a new registration area, the UE 110 may check the stored list of registration areas in the memory arrangement 210. If the new registration area is included in the list, the UE 110 may reattempt to establish an MA session by transmitting an MA-PDU to the network. The UE 110 may also store a corresponding list of registration areas where the MA-PDU has been rejected and when entering this type of registration area, the UE 110 may refrain from reattempting the MA-PDU.

In another exemplary embodiment, the UE 110 may reattempt to establish an MA session when moving into a new registration area based on the type of application data being exchanged with the network. For example, if the application data uses a high reliability and/or a high throughput connection, the UE 110 may reattempt to establish an MA session when moving into a new registration area because the MA session may achieve the reliability and/or throughput requirements of the application data. Examples of these types of application data may include voice recognition application data that typically uses a high reliability connection or multimedia data that typically uses a high throughput connection. On the other hand, there may be application data types that do not use high reliability and/or high throughput connections and therefore the UE 110 may not reattempt to establish an MA session when these types of application data are being used. An example of such application data may be background application data traffic.

The above described exemplary embodiments relate to establishing a MA session. The following exemplary embodiments relate to the UE 110 and the network exchanging ATSSS capability information. The ATSSS capability information may be exchanged during network registration and prior to the UE 110 and the network attempting to establish an MA session. As will be described below, in some exemplary embodiments, the ATSSS capability information may provide the basis for the UE 110 determining not to establish a PDU session.

Figure 7:
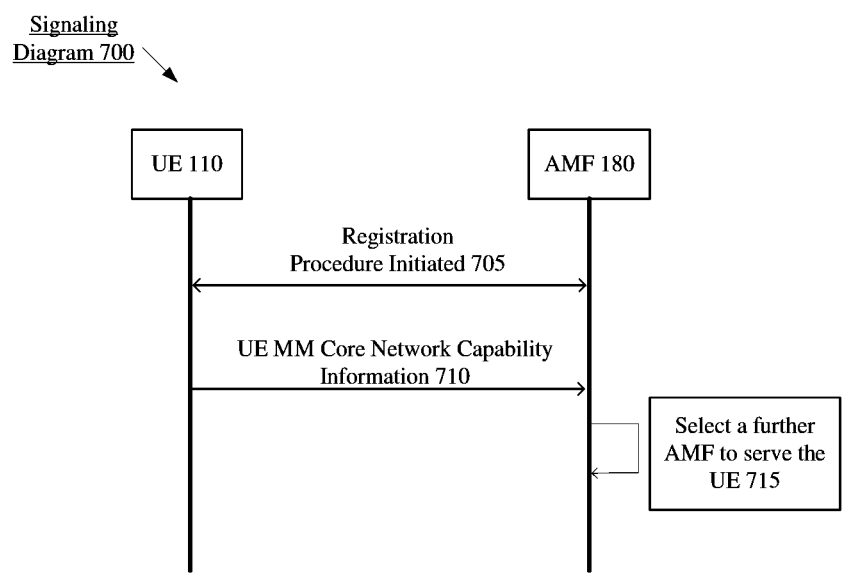
FIG. 7 shows a signaling diagram related to the UE providing the AMF with ATSSS capability information according to various exemplary embodiments.

FIG. 7 shows a signaling diagram 700 related to the UE 110 providing the AMF 180 with ATSSS capability information according to various exemplary embodiments.

Initially, consider the following exemplary scenario. The UE 110 is camped on the gNB 120A. To receive the full scope of functionality normally available via the network connection the UE 110 may register with the network. The registration procedure may occur between the UE 110 and the AMF 180.

In 705, a registration procedure is initiated between the UE 110 and the AMF 180. Those skilled in the art will understand the exemplary embodiments apply to any appropriate type of registration procedure (e.g., an attach procedure, an initial registration procedure, mobility registration update procedure, etc.)

In 710, the UE 110 may transmit an indication to the AMF 180 indicating whether the UE 110 is configured with ATSSS capability. In some embodiments, the UE 110 may include this indication in the UE MM Core network capability information. Those skilled in the art will understand the format of the UE MM core network capability information message and when this message may be transmitted to the network during the registration procedure. However, it should be clear that the ATSSS capability information may be sent by the UE 110 in any type of message at any time during the registration procedure. In this example, the UE 110 supports ATSSS functionality.

An AMF may be configured with AMF selection functionality. For example, a first AMF may select a second different AMF to serve the UE 110 if the first AMF is not an appropriate AMF to serve the UE 110. An AMF may not be an appropriate AMF to serve the UE 110 if the UE 110 supports ATSSS and the first AMF does not support ATSSS. In this example, the AMF 180 is configured with AMF selection functionality and is not configured with ATSSS functionality.

In 715, the AMF 180 selects a further AMF to serve the UE 110. As indicated above, in this example, the UE 110 supports ATSSS functionality and the AMF 180 does not support ATSSS functionality. Thus, the AMF 180 selects a further AMF that is configured with ATSSS to serve the UE 110. Subsequently, additional signaling is exchanged between the UE 110 and the network to complete the registration procedure (not shown).

Figure 8:
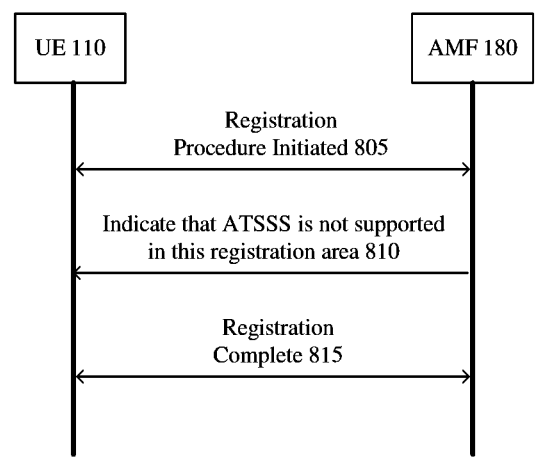
FIG. 8 shows a signaling diagram related to the AMF providing the UE with ATSSS capability information according to various exemplary embodiments.

FIG. 8 shows a signaling diagram 800 related to the AMF 180 providing the UE 110 with ATSSS capability information according to various exemplary embodiments.

In 805, a registration procedure is initiated between the UE 110 and the AMF 180. Those skilled in the art will understand the exemplary embodiments apply to any appropriate type of registration procedure (e.g., an attach procedure, an initial registration procedure, mobility registration update procedure, etc.)

In 810, the AMF 180 may transmit an indication to the UE 110 indicating whether a registration area supports ATSSS functionality. This indication may be provided to the UE 110 at any appropriate point during the registration procedure and in any appropriate format.

In 815, the registration procedure may be completed. When the AMF 180 indicates that ATSSS is not supported in this registration area, the UE 110 may omit transmitting various types of requests when deployed in this registration area to avoid multiple PDU sessions with the same PDU session ID from being created. To provide an example, the UE 110 may not i) request establishment of a MA PDU session, ii) request addition of user plane resources for an existing MA PDU session, iii) request establishment of a PDU session via a "MA PDU Network-Upgrade Allowed indication," iv) request PDU session modification with a request type of "MA PDU request," and/or v) request PDU session modification with a request type of "MA PDU Network-Upgrade Allowed" indication after moving from an evolved packet core (EPC) to a 5G core (5GC). Thus, based on receiving an indication that ATSSS is not supported in this registration area, the UE 110 may omit sending these types of requests despite the occurrence of their normal triggering conditions.

Figure 9:
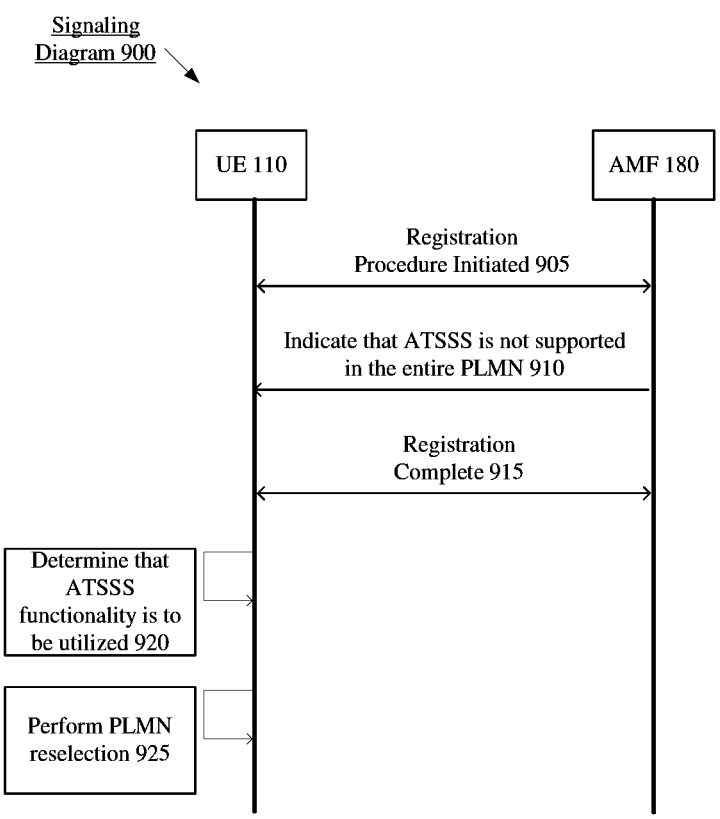
FIG. 9 shows a signaling diagram related to the AMF providing the UE with ATSSS capability information according to various exemplary embodiments.

FIG. 9 shows a signaling diagram 900 related to the AMF 180 providing the UE 110 with ATSSS capability information according to various exemplary embodiments.

In 905, a registration procedure is initiated between the UE 110 and the AMF 180. Those skilled in the art will understand the exemplary embodiments apply to any appropriate type of registration procedure (e.g., an attach procedure, an initial registration procedure, mobility registration update procedure, etc.)

In 910, the AMF 180 may transmit an indication to the UE 110 indicating whether ATSSS is supported in the entire PLMN. This indication may be provided to the UE 110 at any appropriate point during the registration procedure and in any appropriate format.

The PLMN may or may not have uniform support of ATSSS across all of its registration areas. If ATSSS is not supported in the entire PLMN, the UE 110 will be informed of this condition to make a determination as to whether to re-select to another PLMN if the UE 110 wants to utilize ATSSS functionality when roaming. In this example, ATSSS is not supported throughout the entire registration area.

For example, consider the scenario described above with regard to the signaling diagram 800. In 810, the UE 110 receives an indication that ATSSS is not supported in the registration area. Without the indication provided in 910, the UE 110 would not know whether the UE 110 should re-select to another PLMN or whether another registration area in the current serving PLMN supports ATSSS. Thus, the indication provided in 910 allows the UE 110 to make an informed decision regarding PLMN reselection.

Returning to the signaling diagram 900, in 915 the registration procedure may be completed. In 920, the UE 110 determines that ATSSS functionality is to be utilized. In 925, the UE 110 performs PLMN reselection.

Those skilled in the art will understand that the above examples of application data types are only provided for illustrative purposes. There may be other types of application data that trigger or do not trigger an MA-PDU attempt. As described above, the trigger may be based on a predetermined reliability or throughput for the application data. In another example, different types of application data may be defined with a corresponding the MA-PDU trigger characteristic.

In addition, the exemplary embodiments are described with reference to the AMF. In other exemplary embodiments, the functionalities described herein for the AMF may also be performed by a Mobility Management Entity (MME).

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A user equipment (UE), comprising:
   a transceiver configured to communicate with a network; and
   a processor communicatively coupled to the transceiver and configured to perform operations comprising:
   performing a registration procedure with an access and mobility management function (AMF);
   receiving, during the registration procedure, an indication that access traffic steering, switching and splitting (ATSSS) is not supported in a registration area from the AMF;
   determining a trigger condition for a request for addition of user plane resources for an existing multiple access (MA) packet data unit (PDU) session is satisfied; and
   when the indication that ATSSS in not supported is received and the trigger condition is satisfied, omitting transmitting the request for the addition of user plane resources for the existing MA PDU session to a network when the UE is deployed within the registration area based on the indication, despite the trigger condition being satisfied.

2. The UE of claim 1, further comprising determining a second trigger condition for a request for establishment of a new MA PDU session is satisfied; and omitting transmitting a request for establishment of a new MA PDU session.

3. The UE of claim 1, wherein the indication further includes information indicating that ATSSS is not supported in a Public Land Mobile Network (PLMN) and the operations further comprise:
   initiating PLMN reselection based on the indication.

4. The UE of claim 1, wherein the operations further comprise:
   transmitting, during a registration procedure with the network a second indication that the UE supports ATSSS.

5. The UE of claim 4, wherein the registration procedure is one of an attach procedure, an initial registration procedure, or a mobility registration update procedure.

6. The UE of claim 1, wherein the omitted request further comprises
   a request for establishment of a PDU session via a MA PDU Network-Upgrade Allowed indication.

7. The UE of claim 1, wherein the omitted request further comprises a request for a PDU session modification with a request type of MA PDU request.

8. The UE of claim 1, wherein the omitted request further comprises a request for a PDU session modification with a request type of MA PDU Network-Upgrade Allowed indication.

9. A processor of a user equipment (UE) configured to perform operations comprising:
   performing a registration procedure with an access and mobility management function (AMF);
   receiving, during the registration procedure, an indication that access traffic steering, switching and splitting (ATSSS) is not supported in a registration area from the AMF;
   determining a trigger condition for a request for addition of user plane resources for an existing multiple access (MA) packet data unit (PDU) session is satisfied; and
   when the indication that ATSSS is not supported is received and the trigger condition is satisfied, omitting transmitting the request for the addition of user plane resources for the existing MA PDU session to a network when the UE is deployed within the registration area based on the indication, the trigger condition being satisfied.

10. The processor of claim 9, wherein the operations further comprise determining a second trigger condition for a request for establishment of a new MA PDU session is satisfied; and omitting transmitting a request for establishment of a new multiple access (MA) packet data unit (PDU) session.

11. The processor of claim 9, wherein the indication further includes information indicating that ATSSS is not supported in a Public Land Mobile Network (PLMN) and the operations further comprise:
    initiating PLMN reselection based on the indication.

12. The processor of claim 9, wherein the operations further comprise:
    transmitting, during a registration procedure with the network a second indication that the UE supports ATSSS.

13. The processor of claim 12, wherein the registration procedure is one of an attach procedure, an initial registration procedure, or a mobility registration update procedure.

14. The processor of claim 9, wherein the omitted request further comprises
    a request for establishment of a PDU session via a MA PDU Network-Upgrade Allowed indication.

15. The processor of claim 9, wherein the omitted request further comprises a request for a PDU session modification with a request type of MA PDU request.

16. The processor of claim 9, wherein the omitted request further comprises a request for a PDU session modification with a request type of MA PDU Network-Upgrade Allowed indication.

* * * * *